United States Patent
Mobley

(10) Patent No.: US 12,067,156 B2
(45) Date of Patent: Aug. 20, 2024

(54) ELECTRONIC ANTI-TAMPER DEVICE

(71) Applicant: BLUESKYTEC LTD, Wells (GB)

(72) Inventor: Christopher Mobley, Wells (GB)

(73) Assignee: Blueskytec Ltd., Wells (GB)

( * ) Notice: Subject to any disclaimer, the term of this patent is extended or adjusted under 35 U.S.C. 154(b) by 828 days.

(21) Appl. No.: 17/276,541

(22) PCT Filed: Sep. 16, 2019

(86) PCT No.: PCT/GB2019/052598
§ 371 (c)(1),
(2) Date: Mar. 16, 2021

(87) PCT Pub. No.: WO2020/058686
PCT Pub. Date: Mar. 26, 2020

(65) Prior Publication Data
US 2022/0035959 A1 Feb. 3, 2022

(30) Foreign Application Priority Data
Sep. 18, 2018 (GB) ..................................... 1815275

(51) Int. Cl.
*G06F 21/00* (2013.01)
*G01T 7/12* (2006.01)
(Continued)

(52) U.S. Cl.
CPC ................ *G06F 21/87* (2013.01); *G01T 7/12* (2013.01); *G06F 21/86* (2013.01);
(Continued)

(58) Field of Classification Search
CPC ....... G06F 21/86; G06F 21/87; H04L 9/3278; G01T 7/12; G08B 13/1481; H05K 1/0275
See application file for complete search history.

(56) References Cited

U.S. PATENT DOCUMENTS 7,608,812 B2* 10/2009 Beinhocker .......... G08B 13/126
385/12
2003/0025805 A1 2/2003 Yamagishi
(Continued)

FOREIGN PATENT DOCUMENTS

EP 1174839 A1 1/2002
JP 2003348536 A 12/2003
(Continued)

OTHER PUBLICATIONS

Inventgeek, Alpha Radiation Visualizer, webpage, Jun. 25, 2006, 16 pages.

*Primary Examiner* — Jeffrey C Pwu
*Assistant Examiner* — Thong P Truong
(74) *Attorney, Agent, or Firm* — Standley Law Group LLP; Beverly A. Marsh; Kenny W. Pung

(57) ABSTRACT

An anti-tamper assembly is disclosed for a circuit board which comprises one or more electronic components. The assembly comprises a container having side walls, a first closed end and a second, opposing open end, the container being configured to be mounted on said circuit board at said open end, over at least one of the electronic components to form, in use, a sealed cavity around said at least one of said electronic components. The assembly further comprises a source of radioactive particles mounted within the container, an image sensor for capturing image frames within said sealed cavity, in use. The image sensor comprises a detector region defining an array of pixels, a screen member located, in use, within the cavity between the radioactive source and the detector, said screen member having at least one aperture, and a processor for retrieving said captured image frames, monitoring said image frames for changes in the statistical distribution of active pixels and, in the event that (Continued)

statistical distribution of active pixels indicates the presence of a feature in an image frame, generating a tamper alert.

20 Claims, 2 Drawing Sheets

(51) Int. Cl.
*G06F 21/86* (2013.01)
*G06F 21/87* (2013.01)
*G08B 13/14* (2006.01)
*H04L 9/32* (2006.01)
*H05K 1/02* (2006.01)

(52) U.S. Cl.
CPC ........ *G08B 13/1481* (2013.01); *H04L 9/3278* (2013.01); *H05K 1/0275* (2013.01); *H05K 2201/10121* (2013.01)

(56) References Cited

U.S. PATENT DOCUMENTS

| | | |
|---|---|---|
| 2007/0152840 A1 | 7/2007 | Fleischman et al. |
| 2017/0209343 A1 | 7/2017 | Hudson et al. |
| 2018/0067724 A1* | 3/2018 | Baik .................... G01T 1/00 |
| 2018/0211035 A1 | 7/2018 | Costa |

FOREIGN PATENT DOCUMENTS

| | | |
|---|---|---|
| WO | 01/50530 A1 | 7/2001 |
| WO | 2008/102282 A2 | 8/2008 |
| WO | 2018/172731 A1 | 9/2018 |

* cited by examiner

ELECTRONIC ANTI-TAMPER DEVICE

FIELD OF THE INVENTION

This invention relates generally to electronic anti-tamper devices or assemblies, for use with printed integrated circuit boards, to prevent, deter and/or indicate unauthorised tampering in respect thereof.

BACKGROUND OF THE INVENTION

Electronic anti-tamper devices are known in the art and used primarily to protect information and/or technology in integrated circuits or multi-chip modules on printed circuit boards. Such devices are important, not only to protect the information already stored on the electronic system, but also to prevent a third party from installing malware such as viruses, worms or similar programs onto the device. For example, it is desirable to protect certain elements of devices used in financial transactions, such as point of sale devices or ATMs, where information obtained from such devices may be used for criminal purposes. There is also a growing desire to protect IoT devices, such as smart appliances in homes and businesses, or networks which may be connected to the internet, from becoming infected with malware. There are many different types of electronic anti-tamper devices which provide differing levels of security. Some methods simply provide an alert or notification functionality to indicate that the device has been tampered with. Others are configured to destroy/delete protected electronics/information in the event that unauthorised tampering is detected.

A known anti-tamper method comprises placing a coating or seal over a particular component or region of a circuit board. US Patent Publication No. 2004/0222014, for example, describes a method wherein a mesh coating is provided over a circuit assembly, the mesh coating having a unique signature generated by radioactivity (α-particles). A detection module obtains an image of the signature, an tampering may be concluded if a disturbance in the signature is identified. Spaces in the mesh may include electrical components to erase circuit codes and destroy the functionality and value of the protected die if the mesh coating is disturbed.

UK Patent Application No. GB1704392.8 describes an anti-tamper assembly wherein a sealed cavity is created around the components to be protected. A radioactive source is placed within the cavity and an associated sensor is provided at a suitable location to capture images as the radioactive particles hit it s pixels, and a processor to monitor these images and generate a tamper alert in the event that the statistical distribution of active pixels changes to indicate that tampering has occurred. During normal operation, the distribution of active pixels, and their intensity, will be statistically random with no discernible features. If tampering occurs, for example, the container defining the sealed cavity is damaged or removed, the distribution of active pixels will become statistically significant, and 'features' will appear in the images. A learning classifier may be utilised to detect the presence of a statistically significant change of this type and cause a tamper alert to be generated accordingly.

There is an ongoing desire for improved electronic anti-tamper devices which prevent reverse engineering of any electronics protected thereby, and also provides improved protection against physical tampering, whilst minimising any additional weight, size, cost, complexity and/or power consumption often added to circuit boards by conventional anti-tamper devices.

SUMMARY OF THE INVENTION

In accordance with an aspect of the present invention, there is provided an anti-tamper assembly for a circuit board comprising one or more electronic components, the assembly comprising:
  a container having side walls, a first closed end and a second, opposing open end, the container being configured to be mounted on said circuit board at said open end, over at least one of the electronic components to form, in use, a sealed cavity around said at least one of said electronic components;
  a source of radioactive particles mounted within the container;
  an image sensor for capturing image frames within said sealed cavity, in use, wherein said image sensor comprises a detector region defining an array of pixels;
  a screen member located, in use, within the cavity between the radioactive source and the detector, said screen member having at least one aperture; and
  a processor for retrieving said captured image frames, monitoring said image frames for changes in the statistical distribution of active pixels and, in the event that statistical distribution of active pixels indicates the presence of a feature in an image frame, generating a tamper alert.

In a preferred exemplary embodiment, the screen member has a plurality of apertures therein, beneficially the screen member has a random pattern of apertures therein.

Each image frame may be represented by a spatial array of grey scale or colour depth values associated with respective pixels, and the processor may be configured to, in respect of each of a plurality of image frames, generate a respective random number by combining said grey scale or colour depth values.

The radioactive source beneficially comprises a quantum radioactive source of radioactive particles. The radioactive source may generate α-particles, and may, in an exemplary embodiment comprise Americium 241.

The container may be formed of metal, such as copper.

The screen member may be formed of any material that blocks the radioactive particles generated by the radioactive source, for example, metal.

The processor may be configured to perform a feature extraction process on said image frames and, in the event that a feature is detected in an image frame, generate a tamper alert and, in an exemplary embodiment, the processor may be configured to transform each said image frame from a spatial domain to a frequency domain and use said frequency domain to perform said feature extraction process.

Optionally, the processor may include a learning classifier configured to identify statistically significant events in said frequency domain and, in the event that a statistically significant event is identified, cause a tamper alert to be generated.

The above-mentioned detector region of said image sensor may be a complimentary metal-oxide semiconductor (CMOS) detector surface or a charge coupled device (CCD); and the anti-tamper device may further comprise a power source mounted within said container.

In accordance with another aspect of the present invention, there is provided a physically uncloneable function (PUF) generator for use in a cryptographic process, the PUF generator comprising a sealed container within which is mounted a quantum source of radioactive particles, an image sensor comprising a detector region in the form of an array of pixels, and a screen member mounted between said source and said detector region, said screen member having at least one aperture therein, the PUF generator further comprising a processor for receiving, from said image sensor, captured image frames from within said sealed container representative of active pixels, each captured image frame comprising a physically uncloneable function in the form of an array of grey scale or colour depth values.

The processor may be configured to generate a random number for use in a cryptographic process, by combining, in respect of each image frame, said respective grey scale or colour depth values.

Once again, the screen member beneficially has a plurality of apertures therein and, in an exemplary embodiment, may have a random pattern of apertures therein.

These and other aspects of the invention will be apparent from the following detailed description.

BRIEF DESCRIPTION OF THE DRAWINGS

Embodiments of the present invention will now be described, by way of examples only, and with reference to the accompanying drawings, in which.

DETAILED DESCRIPTION

Figure 1:
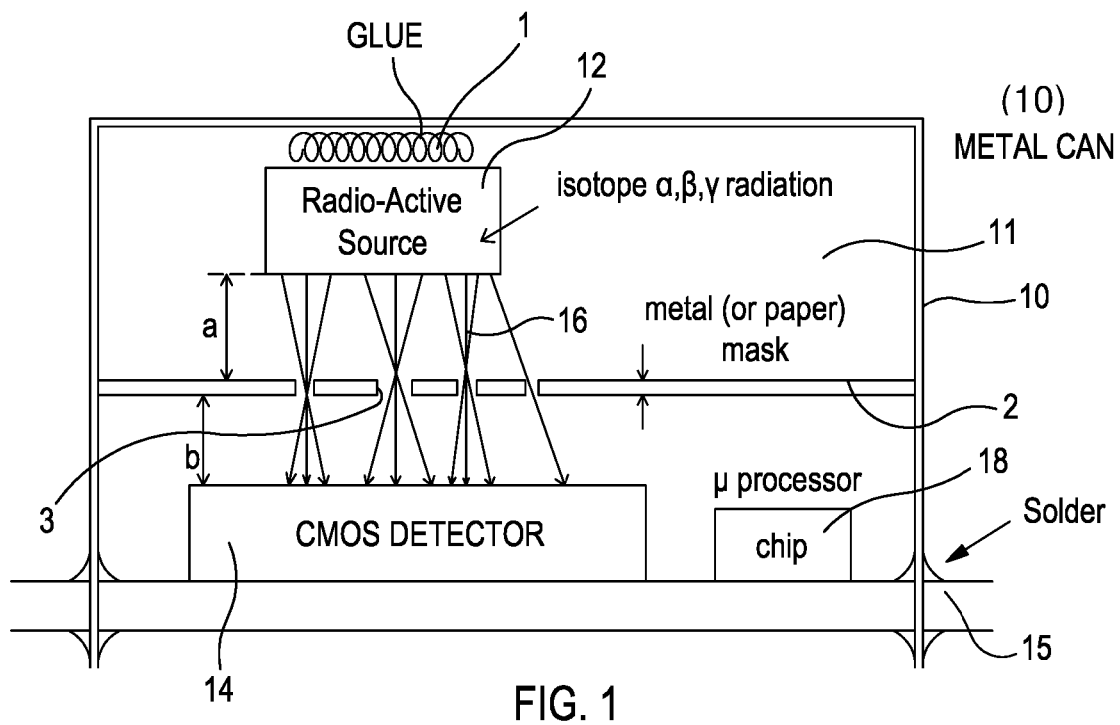
FIG. 1 is a schematic side cross-sectional view through an anti-tamper device according to an exemplary embodiment of the invention.

Referring to FIG. 1 of the drawings, an anti-tamper assembly according to an exemplary embodiment of the invention comprises a box or can 10 having side walls, a 'top' wall and an open 'bottom' end. In an exemplary embodiment of the invention, the can 10 may be of generally square or rectangular lateral cross-section, but the invention is not necessarily intended to be limited in this regard, and it will be apparent to a person skilled in the art that the can 10 could be of any suitable lateral cross section. For example, it could be generally cylindrical and have a generally circular lateral cross section.

The can 10 is configured to be mounted over one or more electronic components 13 on a printed circuit board (PCB) 15, so as to provide anti-tamper functionality to that/those component(s) 13. The PCB 15 comprises a uniform (uninterrupted) layer 21 of, for example, copper that surrounds the component(s) 13 to be protected, and the can 10 is mounted, via its open end, onto the layer 21 to form a sealed cavity 11 around the component(s) 13. The layer 21 thus forms an anti-tamper boundary around the component(s) 13 to be protected and the can 10 is soldered onto the boundary layer 21 to form a sealed cavity around the component(s) 13.

For the avoidance of doubt, the directional terms used herein, such as 'top', 'bottom', 'lower', 'vertical', 'lateral', etc. refer to the described (exemplary) assembly when oriented for use, i.e. when the PCB 15 is horizontal and generally parallel to the ground. However, it will be appreciated that, in some applications, the PCB may not necessarily be so oriented, thus altering the orientation of the associated anti-tamper assembly.

The can 10 is advantageously formed of a hard metal, such as copper, which is highly resilient to damage, deterioration and deformation, as well as being capable of blocking radioactive particles, particularly α- and β-particles with a relatively thin wall. However, it will be appreciated by a person skilled in the art that alternative materials could be used, and the present invention is not necessarily intended to be limited in this regard.

A quantum source 12 of radiation is mounted, or otherwise provided, on the inner surface of the top wall of the can 10. In an exemplary embodiment of the invention, the source 12 may be mounted on the top wall of the can 10 by a layer 1 of adhesive, but other means of mounting will be apparent to a person skilled in the art.

In a preferred exemplary embodiment, the radioactive source 12 is selected to produce a constant random source of α-particles, since α-particles have a short range and are relatively easily blocked by thin layers of material, even paper, such that the walls of the can 10 can be made relatively very thin and the additional weight/cost added to the PCB by the anti-tamper assembly is minimised. A suitable radioactive source of this type might be Americium 241, which is known for use in smoke detectors and the like, and is considered relatively safe for humans when handled appropriately, and also has a relatively long half life. However, the present invention is not necessarily intended to be limited in this regard, and other suitable radioactive sources will be apparent to a person skilled in the art. Indeed, a radioactive source that emits β-particles could be used, but then the walls of the can 10 may need to be thicker (approximately 2 mm thick for β-particles up to an energy of 4 MeV) for safety reasons, thereby increasing the weight and cost of the assembly. All radioactive sources have a respective unique fingerprint in terms of its emissions per second and its physical properties.

A sensor 14 is mounted on the PCB 15, within the cavity 11, an located generally below the radioactive source 12, with the detector region thereof facing the radioactive source 12. The sensor 14 may be a camera, such as a CMOS camera or charge coupled device (CCD) camera, with the lens removed, although any detector sensitive to ionising radiation can be used and the present invention is not necessarily intended to be limited in this regard.

A screen 2 is mounted, or otherwise provided between the radioactive source and the sensor 14. In this exemplary embodiment, the screen 2 is affixed within the can 10, between its side walls, so that it extends across the whole of its lateral cross section. The screen may be formed of any suitable material, such as plastic or even paper, but in an exemplary embodiment, a metal screen 2 is provided. As the screen 2 is intended to form a 'mask' between the radioactive particles and the sensor 14, the only limitation on the material that could be used is that it must be able to block the radioactive particles utilised.

Figure 4:
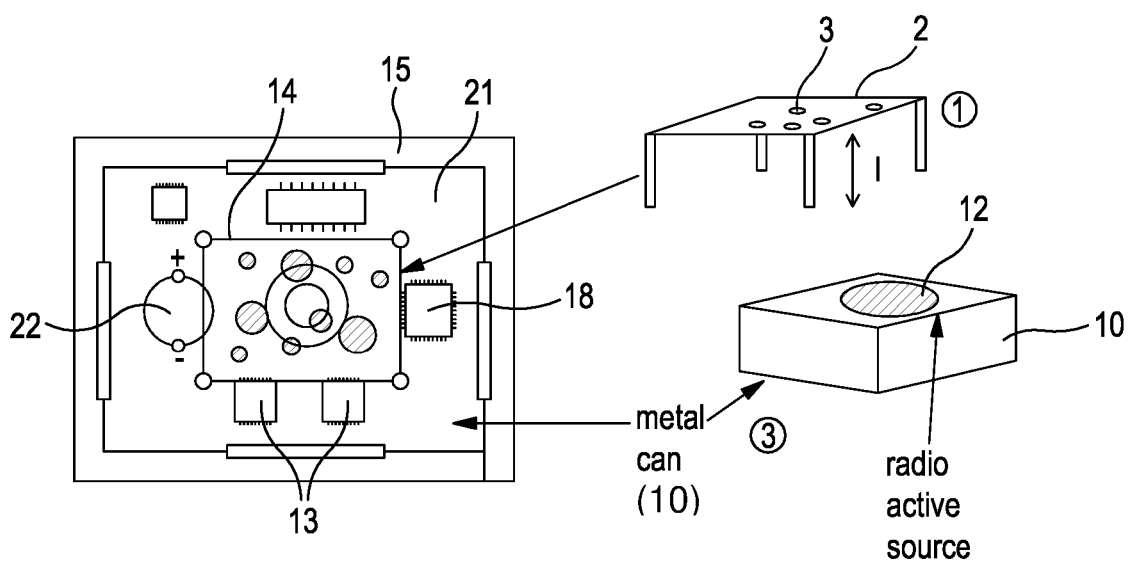
FIG. 4 is a schematic exploded view of an anti-tamper device according to an exemplary embodiment of the invention, showing the PCB including the image sensor, the screen member and the can.

Referring additionally to FIG. 4 of the drawings, it can be seen that the screen 2 comprises a "table" like structure that fits over the detector 14 (mounted on the PCB 15), and then the can 10 fits over the top of the screen member 2 to create the sealed cavity 11.

Figure 2:
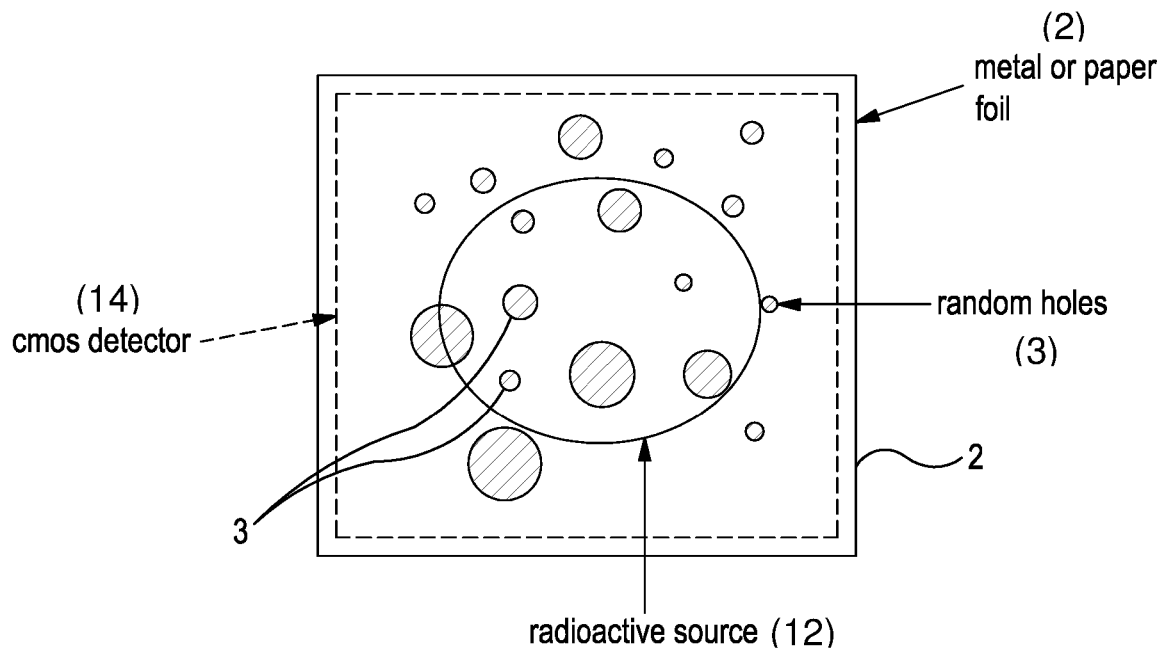
FIG. 2 is a schematic plan view of a screen member of an anti-tamper device according to an exemplary embodiment of the invention.

At least in the region of the source 12 and sensor 14, the screen is provided with a plurality of apertures 3, as shown in FIG. 2 of the drawings. The pattern of apertures used is random in nature, size and position.

Figure 3:
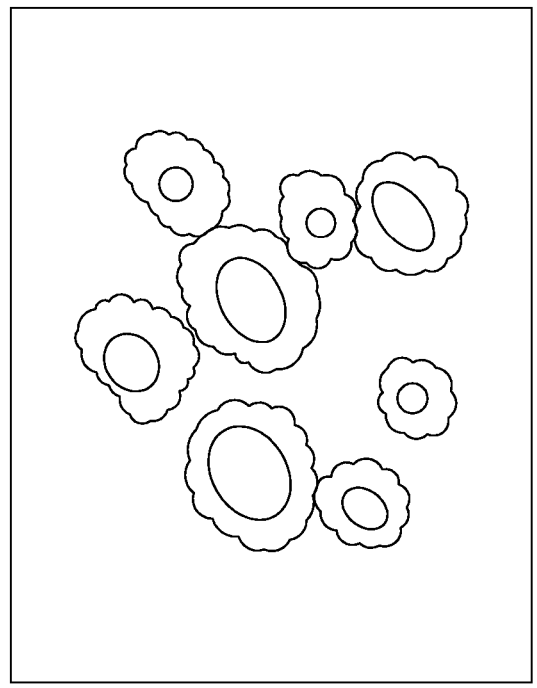
FIG. 3 is a schematic view of an image frame captured in an anti-tamper device according to an exemplary embodiment of the present invention.

The image sensor 14 comprises an array of M by N pixels. In use, the radioactive source 12 emits radioactive particles 16 which fill, and are contained within, the cavity 11. As the particles 16 hit the screen 2, at the location of the apertures 3, some will pass through to the sensor 14. When a particle 16 hits a pixel of the image sensor 14, it causes a change in energy, which generates a charge on the pixel, making it 'active'. This charge, and its intensity, is typically quantified in terms of a corresponding grey scale or colour depth value, and each set of pixels is output in the form of a respective image frame, as illustrated in FIG. 3 of the drawings.

Even without the screen, because the motion of the particles within the sealed cavity conforms to Brownian motion, it is a random process where the individual particles experience random interactions with each other, but with the screen 2, the particles also randomly interact with that as well and the side edges of the apertures 3 as they pass through. Thus, not only is each captured image (i.e. pattern of grey scale or colour values) entirely random, it is effectively a physically uncloneable function (PUF) which can never be repeated. The random nature of the apertures 3 in the screen 2 results in a unique pattern of radiation on the detector for each frame. The patterns are continually formed, even when power is removed from the circuit, although the sensor 14 will not detect the pattern with the power off. The pattern is affected by the size and physical properties of the radioactive source, the isotope of the radioactive source, the distance of the screen 2 from the source 12, the distance of the screen 2 from the detector 14, the sensitivity and properties of the sensor 14, and the physical construction properties of the cavity 11 as well as, of course, the pattern of apertures 3 in the screen 2.

With the power removed, the PUF cannot be determined from the screen 2 alone, since it is also dependent on the interactions between the emitted radiation, the screen 2 and the detector 14. Thus, if the screen 2 is removed from the can 10, then the original pattern cannot be determined from the screen alone. Only the complete removal of the detector 14, screen 2 and radiation source 12 can be used to determine the original pattern. As a result, the present invention provides an anti-tamper assembly that generates a pattern that cannot be cloned so that two instances of the system itself cannot ever exist. This, in turn, prevents impersonation and, therefore, an attack on the system using a cloned version of itself.

Images are captured periodically within the sealed cavity 11, and the resultant array of grey scale or colour depth values of each captured frame can be used to generate a random number. For example, the captured pixel values may simply be multiplied or added together, although other suitable algorithms will be apparent to a person skilled in the art. Irrespective of the manner in which the values representative of a captured image frame are combined to generate a value, a series of such numbers will thus be generated over time, and can be fed to a separate cryptographic module for use therein in one of a number of cryptographic processes requiring the use of random numbers.

During normal operation, i.e. when no tampering has occurred, the statistical distribution of the active pixels across the image frame, and their intensity, will be statistically random with no 'features'. In other words, the images are representative of the emission from the quantum random source of α-particles (in this case) following their interaction with each other, the inside of the sealed cavity, the screen and the side edges of the apertures therein. However, if tampering occurs such that, for example, the seal of the container is broken or the contained random source of radioactive particles is otherwise disturbed, then features will start to appear in the image frames that are statistically significant and, therefore, indicate a tamper. 'Features' in this context may be a dot of high intensity pixels or a line or shape of high intensity pixels, for example.

Furthermore, and as explained above, even if such tampering does occur, the 'pattern' generating the random number will not be discernible from the mask alone.

A processor 18 is provided on the PCB 15 to a) receive the captured images in the form of an array of greyscale/colour values and use those values to generate a representative random number; and b) monitor the images and, if features are detected, generate a tamper alert. To this end, a number of different 'feature' detection or extraction processes may be utilised by the processor 18 and will be apparent to a person skilled in the art. For example, the processor 18 may be configured to transform each image from the spatial domain to the frequency domain. Features in an image will appear in the frequency domain as "spikes". Thus, a learning classifier may be employed within the processor 18 to identify "spikes", or other statistically significant events, in the frequency trace and generate a tamper alert if such an event is identified. The processor 18 may also be configured to take into account longer-term changes in the statistical distribution and intensity over time, due to a drop in radioactivity due to radioactive decay. However Americium has a half-life of 432 years, so it is not expected that there will be a noticeable change in intensity from year to year.

In order to power the sensor 14 and processor 18, a battery 22 may be provided on the PCB 15 and contained within the cavity 11.

This device secures an electronic system from tamper by physical, electro-magnetic and radioactive interference. The concept is to have a physically secure cavity 11 that detects mechanical impact, electro-magnetic and radiation impinging upon the secure cavity 11. Within this cavity electronic 13 that need security will be located. The functionality of the assembly can be summarised thus: a) the cavity 11 is formed by soldering a copper box/can 10 to a PCB 15 with uninterrupted copper layers; b) the cavity 11 is filled with radioactive particles 16 from a radioactive source which preferably produces predominantly α-particles, such as Americium-241 and a camera captures images within the sealed cavity 11; c) a processor 18 reads the image frames, which comprise an array of greyscale or colour depth values, and processes them for statistically significant events; d) the processor, located within the cavity, will generate and alert signal if unauthorised tampering is detected. The processor may be configured to erase or destroy its contents if unauthorised tampering is detected.

Statistically significant events within the images (i.e. 'features') can occur for a number of reasons. If, for example, the box/can 10 is breached where there are no photons to flood the photo sensor, then the tamper will still be detected, as the camera 14 will be shifted in position relative to the radioactive source. This alters the image statistics, and the processor detects this as unauthorised tampering, and therefore will generate the alert signal. Emissions by high-energy particles, such as those which may be emitted by Scanning Electron Microscopes, or other radiation (e.g. X-rays) will result in the sensitivity of the CMOS detector surface being altered away from the statistical norm of the sealed cavity 11. High-energy particles will cause "hot-spots" on the CMOS detector surface (i.e. constant high grey scale or colour depth values which don't vary between images) and will thus alter the image statistics. Each of these cases results in the processor detecting a sudden change, and generating an alert signal.

In addition (or even alternatively), the assembly of the present invention can be used to generate a physically uncloneable function (PUF) for any cryptographic process, by using the image frames to generate truly random numbers.

It will be apparent to a person skilled in the art, from the foregoing detailed description, that variations and modifications can be made to the described embodiments without departing from the scope of the invention as defined by the appended claims.

The invention claimed is:

1. An anti-tamper assembly for a circuit board comprising one or more electronic components, the assembly comprising:
   a container having side walls, a first closed end and a second, opposing open end, the container being configured to be mounted on said circuit board at said open end, over at least one of the electronic components to form, in use, a sealed cavity around said at least one of said electronic components;
   a source of radioactive particles mounted within the container;
   an image sensor for capturing image frames within said sealed cavity, in use, wherein said image sensor comprises a detector region defining an array of pixels;
   a screen member located, in use, within the cavity between the radioactive source and the detector, said screen member having at least one aperture; and
   a processor for retrieving said captured image frames, monitoring said image frames for changes in the statistical distribution of active pixels and, in the event that statistical distribution of active pixels indicates the presence of a feature in an image frame, generating a tamper alert.

2. The anti-tamper assembly according to claim 1, wherein said screen has a plurality of apertures therein.

3. The anti-tamper assembly according to claim 2, wherein said screen has a random pattern of apertures therein.

4. The anti-tamper assembly according to claim 1, wherein each image frame is represented by a spatial array of grey scale or colour depth values associated with respective pixels.

5. The anti-tamper assembly according to claim 4, wherein said processor is configured to, in respect of each of a plurality of image frames, generate a respective random number by combining said grey scale or colour depth values.

6. The anti-tamper assembly according to claim 1, wherein said radioactive source comprises a quantum radioactive source of radioactive particles.

7. The anti-tamper assembly according to claim 1, wherein said radioactive source generates α-particles.

8. The anti-tamper assembly according to claim 1, wherein said radioactive source is Americium 241.

9. The anti-tamper assembly according to claim 1, wherein said container is formed of metal.

10. The anti-tamper assembly according to claim 9, wherein said container is formed of copper.

11. The anti-tamper assembly according to claim 1, wherein said screen member is formed of a material that blocks the radioactive particles generated by the radioactive source.

12. The anti-tamper assembly according to claim 1, wherein said screen member is formed of metal.

13. The anti-tamper assembly according to claim 1, wherein said processor is configured to perform a feature extraction process on said image frames and, in the event that a feature is detected in an image frame, generate a tamper alert.

14. The anti-tamper assembly according to claim 13, wherein said processor is configured to transform each said image frame from a spatial domain to a frequency domain and use said frequency domain to perform said feature extraction process.

15. The anti-tamper assembly according to claim 14, wherein said processor includes a learning classifier configured to identify statistically significant events in said frequency domain and, in the event that a statistically significant event is identified, cause a tamper alert to be generated.

16. The anti-tamper assembly according to claim 1, wherein said detector region of said image sensor is a complimentary metal-oxide semiconductor (CMOS) detector surface or a charge coupled device (CCD).

17. The anti-tamper assembly according to claim 1, further comprising a power source mounted within said container.

18. A physically uncloneable function (PUF) generator for use in a cryptographic process, the PUF generator comprising a sealed container within which is mounted a quantum source of radioactive particles, an image sensor comprising a detector region in the form of an array of pixels, and a screen member mounted between said source and said detector region, said screen member having at least one aperture therein, the PUF generator further comprising a processor for receiving, from said image sensor, captured image frames from within said sealed container representative of active pixels, each captured image frame comprising a physically uncloneable function in the form of an array of grey scale or colour depth values.

19. The PUF generator according to claim 18, wherein said processor is further configured to generate a random number by combining, in respect of each image frame, said respective grey scale or colour depth values.

20. The PUF generator according to claim 19, wherein said screen has a plurality of apertures therein, preferably randomly arranged.

* * * * *